(12) United States Patent
Pingel et al.

(10) Patent No.: US 11,654,618 B2
(45) Date of Patent: *May 23, 2023

(54) THREE DIMENSIONAL PRINTING SYSTEM WITH PARTIALLY IMMERSED IMAGING BAR DEFINING BUILD PLANE BELOW A FREE SURFACE OF PHOTOCURABLE RESIN

(71) Applicant: 3D Systems, Inc., Rock Hill, SC (US)

(72) Inventors: James Pingel, San Diego, CA (US); Robert W. Beauchamp, Carlsbad, CA (US); Dominic Murphy, Portland, OR (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/845,292

(22) Filed: Apr. 10, 2020

(65) Prior Publication Data

US 2020/0338811 A1 Oct. 29, 2020

Related U.S. Application Data

(60) Provisional application No. 62/838,511, filed on Apr. 25, 2019.

(51) Int. Cl.
*B29C 64/129* (2017.01)
*B33Y 30/00* (2015.01)
(Continued)

(52) U.S. Cl.
CPC .......... *B29C 64/129* (2017.08); *B29C 64/236* (2017.08); *B29C 64/277* (2017.08);
(Continued)

(58) Field of Classification Search
CPC ... B29C 64/264; B29C 64/277; B29C 64/286; B29C 64/364; B29C 64/371;
(Continued)

(56) References Cited

U.S. PATENT DOCUMENTS

| 4,801,477 A * | 1/1989 | Fudim ................... G03F 7/0037 430/269 |
| 5,391,072 A * | 2/1995 | Lawton .................. B33Y 10/00 264/401 |

(Continued)

*Primary Examiner* — Seyed Masoud Malekzadeh
*Assistant Examiner* — Jennifer L Groux

(57) ABSTRACT

A three-dimensional printing system for fabricating a three-dimensional article includes a resin vessel, a motorized build plate, an imaging bar, and a movement mechanism. The resin vessel is for containing a photocurable resin, the photocurable resin having an upper resin surface. The motorized build plate is for supporting the three-dimensional article in the photocurable resin. The imaging bar includes a plurality of light emitting devices arranged along a transverse axis for emitting light generally downwardly and a transparent sheet disposed below the plurality of light emitting devices. The transparent sheet has a lower surface to contact the resin and define a build plane below the upper surface of the resin. The movement mechanism is for imparting movement of the imaging bar along a scan axis.

5 Claims, 3 Drawing Sheets

(51) Int. Cl.
*B29C 64/364* (2017.01)
*B29C 64/277* (2017.01)
*B29C 64/236* (2017.01)
*B33Y 10/00* (2015.01)

(52) U.S. Cl.
CPC ............ *B29C 64/364* (2017.08); *B33Y 10/00* (2014.12); *B33Y 30/00* (2014.12)

(58) Field of Classification Search
CPC ... B29C 64/106; B29C 64/124; B29C 64/129; B29C 64/135; B29C 64/236
See application file for complete search history.

(56) References Cited

U.S. PATENT DOCUMENTS

| | | | |
|---|---|---|---|
| 9,840,045 B2* | 12/2017 | Linnell | B33Y 30/00 |
| 11,104,075 B2* | 8/2021 | Prucha | B29C 64/25 |
| 2011/0313560 A1* | 12/2011 | Hangaard | B33Y 30/00 |
| | | | 700/120 |
| 2015/0277146 A1* | 10/2015 | Crespo Vázquez | ............ |
| | | | B29D 11/00009 |
| | | | 264/1.36 |
| 2016/0047980 A1* | 2/2016 | Page | G02B 6/138 |
| | | | 264/413 |
| 2016/0200052 A1* | 7/2016 | Moore | B29C 64/245 |
| | | | 264/401 |
| 2016/0303805 A1* | 10/2016 | Chen | B29C 64/135 |
| 2018/0056587 A1* | 3/2018 | Arai | B29C 64/364 |
| 2019/0291343 A1* | 9/2019 | Feller | B29C 64/264 |
| 2020/0180225 A1* | 6/2020 | Zenou | B29C 64/10 |
| 2021/0291436 A1* | 9/2021 | Lawless | B29C 64/393 |

\* cited by examiner

THREE DIMENSIONAL PRINTING SYSTEM WITH PARTIALLY IMMERSED IMAGING BAR DEFINING BUILD PLANE BELOW A FREE SURFACE OF PHOTOCURABLE RESIN

CROSS-REFERENCE TO RELATED APPLICATION FIELD OF THE INVENTION

This non-provisional patent application claims priority to U.S. Provisional Application Ser. No. 62/838,511, Entitled "Three Dimensional Printing System with Partially Immersed Imaging Bar Defining Build Plane Below a Free Surface of Photocurable Resin" by James Pingel et al., filed on Apr. 25, 2019, incorporated herein by reference under the benefit of U.S.C. 119(e).

FIELD OF THE INVENTION

The present disclosure concerns an apparatus and method for fabrication of solid three dimensional (3D) articles of manufacture from radiation curable (photocurable) resins. More particularly, the present disclosure concerns a system that improves productivity and resolution.

BACKGROUND

Three dimensional (3D) printers are in rapidly increasing use. One class of 3D printers includes stereolithography printers having a general principle of operation including the selective curing and hardening of radiation curable (photocurable) liquid resins. A typical stereolithography system includes a resin vessel holding the photocurable resin, a movement mechanism coupled to a support surface, and a controllable light engine. The stereolithography system forms a three dimensional (3D) article of manufacture by selectively curing layers of the photocurable resin. Each selectively cured layer is formed at a "build plane" within the resin. One challenge with these systems is to improve the speed of processing for large build plane systems. Another challenge is to provide high resolution.

SUMMARY

Figure 1:
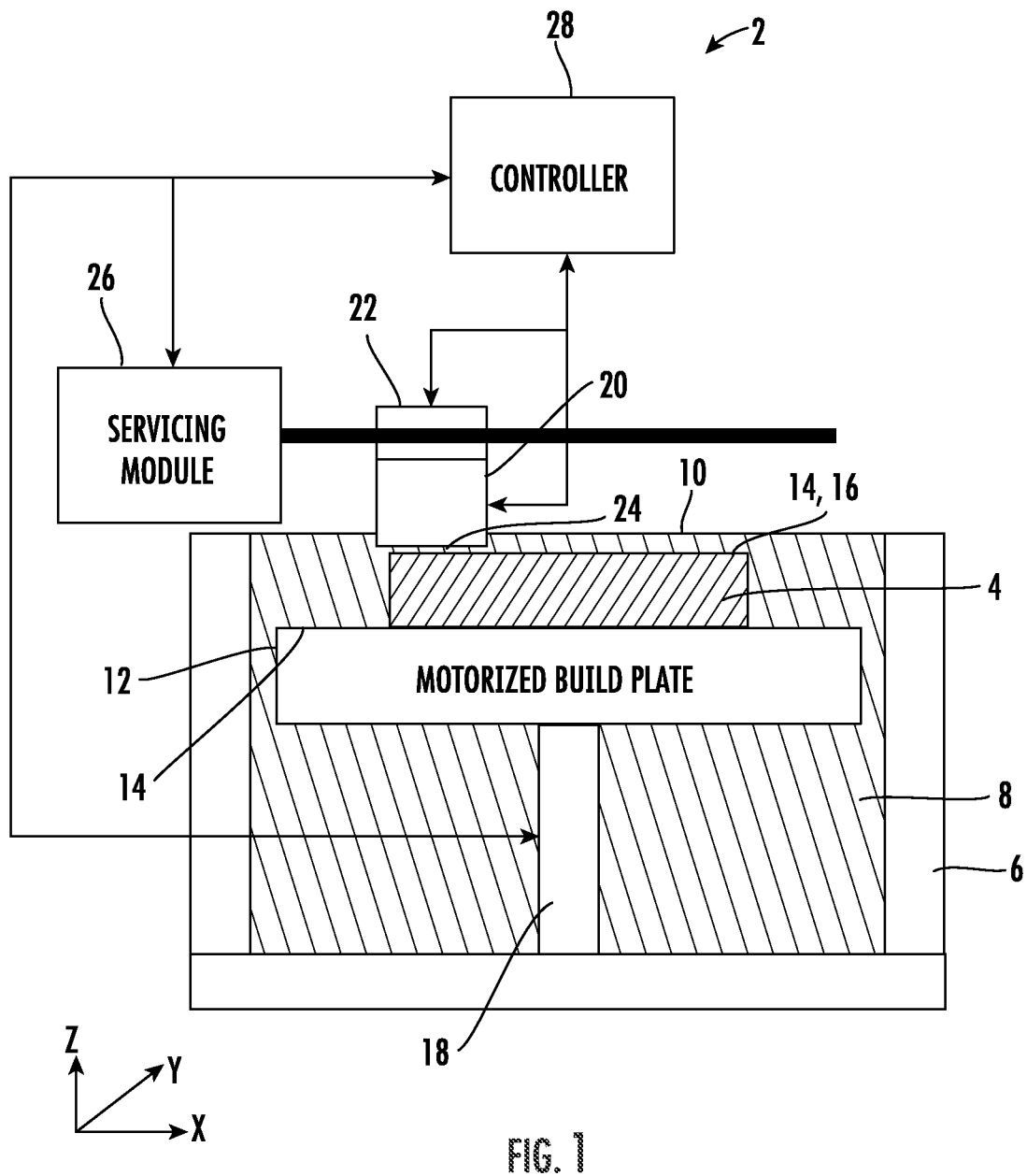
FIG. 1 is a schematic diagram of an embodiment of a three-dimensional printing system for fabricating a three-dimensional article.

In a first aspect of the disclosure, a three-dimensional printing system for fabricating a three-dimensional (3D) article includes a resin vessel, a motorized build plate, an imaging bar, and a movement mechanism. The resin vessel is for containing a photocurable resin, the photocurable resin having an upper resin surface. The motorized build plate is for supporting the three-dimensional article in the photocurable resin. The imaging bar includes a plurality of light emitting devices arranged along a transverse axis for emitting light generally downwardly and a transparent sheet disposed below the plurality of light emitting devices. The transparent sheet has a lower surface to contact the resin and define a build plane below the upper surface of the resin. The movement mechanism is for imparting movement of the imaging bar along a scan axis.

In one implementation, the three-dimensional printing system includes a controller configured to: operate the motorized build plate to position an upper surface (of the build plate or 3D article) at the build plane; operate the movement mechanism to translate the imaging bar along the scan axis; concurrent with translating the imaging bar, operate the plurality of light emitting devices to selectively harden the photocurable resin at the build plane; repeat operating the motorized build plate, the movement mechanism, and the imaging bar to complete fabrication of the three-dimensional article.

In another implementation, the imaging bar includes a layer of collimation and/or focusing optics that overlay light emitting devices. The imaging bar also includes a mask layer overlaying the layer of collimation and/or focusing optics defining a plurality of apertures that individually receive and clip light from the plurality of light emitting devices.

In yet another implementation, the transparent sheet is at least partially permeable to a gaseous inhibitor to inhibit curing of the resin upon the transparent sheet by defining a cure depletion zone between the lower surface of the transparent sheet and the build plane. The imaging bar can also define a channel above the transparent sheet for carrying the gaseous inhibitor.

In a second aspect of the disclosure, a method is provided for manufacturing a three-dimensional (3D) article. The method includes: providing and operating a system including a resin vessel, a motorized build plate, an imaging bar, and a movement mechanism. The resin vessel contains photocurable resin having an upper resin surface. The motorized build plate is for supporting the 3D article in the photocurable resin. The imaging bar includes a plurality of light emitting devices arranged along a transverse axis for emitting light generally downwardly and a transparent sheet disposed below the plurality of light emitting devices, the transparent sheet having a lower surface to contact the resin and define a build plane below the upper surface of the resin. The movement mechanism is for imparting movement of the imaging bar along a lateral scan axis. Operating the system includes operating the motorized build plate to position an upper surface of the build plate or the 3D article proximate to the build plane, operating the movement mechanism to translate the imaging bar along the lateral scan axis, the transparent sheet moving along the build plate while the lower surface of the transparent sheet is immersed in the resin and facing the upper surface of the build plate or the 3D article, concurrent with operating the movement mechanism, operating the plurality of light emitting devices to selectively harden a layer of resin over the build plane and onto the upper surface of the build plate or the 3D article, and repeating operation of the motorized build plate, the movement mechanism, and the plurality of light emitting devices to complete fabrication of the 3D article in a layer-by-layer manner.

In one implementation the transparent sheet is at least partially permeable to a gaseous inhibitor and the imaging bar defines an channel above the transparent sheet. The method further includes supplying a gaseous inhibitor through the channel and over an upper surface of the transparent sheet. Supplying the gaseous inhibitor can include allowing ambient air to pass through the channel.

One advantage of the disclosed system and method is an ability to precisely define features at the build plane. This is because a physical distance between the LEDs and the build plane and the upper surface (of the build plate or 3D article) is minimized. Thus, off angle light is less of an issue than would be the case for longer optical paths.

DETAILED DESCRIPTION OF THE PREFERRED EMBODIMENTS

FIG. 1 is a schematic diagram of an embodiment of a three-dimensional printing system 2 for fabricating a three-dimensional article 4. In describing system 2, mutually orthogonal axes X, Y, and Z can be used. Axes X and Y are lateral axes that are generally horizontal. Axis Z is a vertical axis that is generally aligned with a gravitational reference. Generally aligned means aligned by design but to within normal manufacturing tolerances. The axis X can be referred to as a scan axis X. The axis Y can be referred to as a transverse axis Y.

System 2 includes a resin vessel 6 containing a liquid photocurable resin 8. The resin 8 defines a free upper surface 10. By "free" the upper surface is in contact with a surrounding gaseous atmosphere (e.g., surrounding air or nitrogen) as opposed to being constrained by a wall. Within the photocurable resin 8 is a motorized build plate 12 having an upper surface 14 that supports the three-dimensional article 4. An upper surface 14 of the three-dimensional article is also referred to by the same element 14 because one action of the motorized build plate 12 is to vertically position the upper surface 14 at a build plane 16 at which an accretive hardened layer of the photocurable resin 8 is to be formed. A lift mechanism 18 forms a part of the motorized build plate 12.

An imaging bar 20 is coupled to a lateral movement mechanism 22. The movement mechanism 22 is configured to scan the imaging bar 20 along a scan axis X. The imaging bar 20 emits radiation downwardly from a lower surface (of the imaging bar) 24. The lower surface 24 is immersed in the photocurable resin 8 and the resultant build plane 16 is below the free surface 10 of the photocurable resin 8.

System 2 also can include a servicing module 26. Servicing module 26 can be for cleaning the imaging bar 20 when it is not in use to remove photocurable resin residue from the imaging bar. Servicing module 26 can include a wiper and/or other cleaning devices.

A controller 28 is coupled to and configured to operate the motorized build plate 12 (through the lift mechanism 18), the imaging bar 20, the movement mechanism 22, and the servicing module 26. The controller 28 includes a processor coupled to an information storage device. The information storage device includes a non-transitory computer readable storage medium that stores software instructions. In response to execution by the processor, the software instructions operate portions of system 2 to at least perform the following steps: (1) operate the motorized build plate 12 to position the upper surface 14 at the build plane 16; (2) operate the movement mechanism 22 to scan the imaging bar along scan axis X; (3) concurrent with (2); operate the imaging bar 20 selectively image and harden resin 8 at the build plane 16; (4) repeat operation of the motorized build plate 12, the movement mechanism 22 and the imaging bar 20 to complete fabrication of the three-dimensional article 4 in a layer-by-layer manner.

Figure 2:
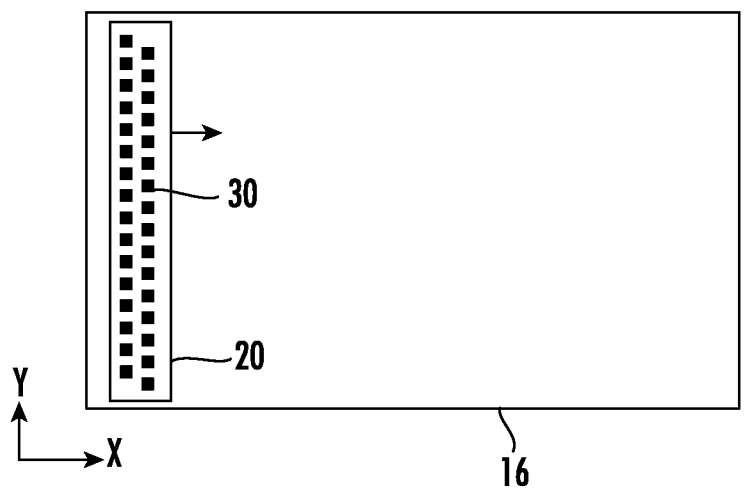
FIG. 2 is a schematic diagram of a build plane overlaid with an imaging bar.

FIG. 2 is a lateral schematic diagram of the build plane 16 overlaid with the imaging bar 20. The light bar 20 includes a plurality of light emitting devices 30 arranged along the transverse axis Y. The imaging bar 20 is configured to scan along the scan axis X. Because the plurality of light emitting devices 30 spans the width of the build plane along Y, this allows a single pass or scan to completely but selectively image a layer of photocurable resin 8 over the entire build plane 16. In some embodiments, multiple passes or scans may be required. For multi-pass systems, the movement mechanism 22 may be configured to position and move the imaging bar 20 along the two lateral axes X and Y.

Figure 3:
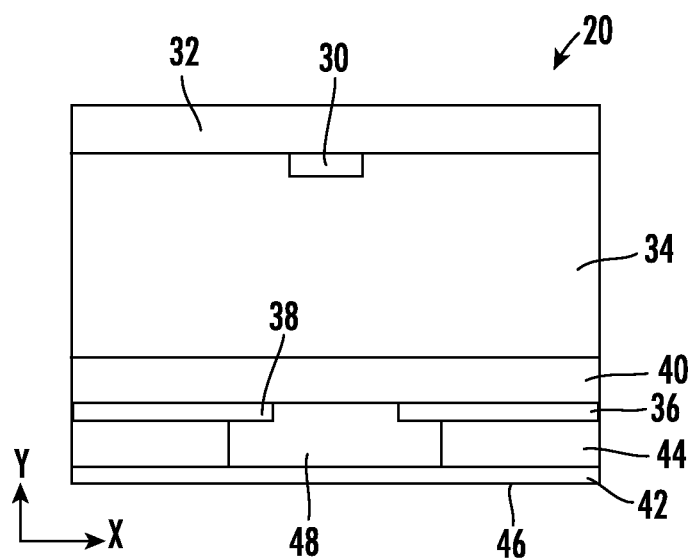
FIG. 3 is a schematic diagram depicting a cross-section through an embodiment of an imaging bar.

FIG. 3 is a diagram depicting a cross section through an embodiment of an imaging bar 20. The diagram of FIG. 3 is not to scale. Imaging bar 20 includes a substrate 32 that supports the plurality of light emitting devices 30 (one shown). In some embodiments, the light emitting devices 30 are light emitting diodes (LEDs). In other embodiments, the light emitting devices 30 are lasers such as diode lasers. In yet other embodiments, the light emitting devices are vertical surface emitting lasers (VCSELs).

Overlaying the light emitting devices 30 is one or more focusing and/or collimation layer(s) 34. The light emitting device 30 can output radiation having a generally conical angular distribution (when the light emitting device 30 is an LED). Layer 34 images the light upon the build plane 16 and can help to reduce the angular extent of the conical distribution.

Overlaying layer(s) 34 is a mask layer 36 that defines apertures 38. Aperture 38 is shown aligned to the light emitting device 30. The metal mask 36 clips and removes off-angle radiation from the light received from the light emitting device 30 to allow small pixels to be imaged on build plane 16. Preferably, the aperture 38 is as close to the build plane 16 as possible. In the illustrated embodiment, the mask 36 is a metal layer formed onto a glass plate 40.

Overlaying the mask layer 36 is a transparent sheet 42 supported by a spacer plate 44. The transparent sheet 42 has a lower surface 46 that is to be in contact with the photocurable resin 8. The spacer plate is in contact with the mask and separates the mask from the transparent sheet. The spacer plate 44 defines gas channels 48. The lower surface 46 can be the same as the lower surface 24 of FIG. 1.

In an illustrative embodiment, the gas channels 48 are configured to carry a gaseous inhibitor such as air or oxygen. The transparent sheet 42 has at least a partial permeability for the gaseous inhibitor so that the gaseous inhibitor can diffuse downwardly to the lower surface 46. When the lower surface 46 is immersed in the photocurable resin 8, the gaseous inhibitor inhibits polymerization and maintains a "depletion zone" proximate to the lower surface 46 when the photocurable resin 8 is being selectively imaged at the build plane 16. This prevents an unwanted buildup of cured photocurable resin 8 upon the lower surface 46.

In one illustrative embodiment, the transparent sheet 42 is a fixed permanent portion of the imaging bar 20. In another embodiment, the transparent sheet 42 is replaceable. In yet another embodiment, the transparent sheet 42 can be in a continuous reel to reel apparatus configuration. If an immersed portion of the transparent sheet 42 becomes damaged then the sheet 42 can be replaced or indexed (along the reel to reel apparatus) to place an unused portion of the sheet under aperture 38.

In one embodiment, the transparent sheet 42 is a flexible polymer sheet having a chemical resistance to photocurable resin while allowing transmission of oxygen as an inhibitor. The transparent sheet is generally transparent to ultraviolet (UV), violet, or blue light. The polymer sheet may include one or more polymers such as polyvinylidene fluoride (PVDF), ethylenchlorotrifluoroethylene (ECTFE), ethyl enetetrafluoroethylene (ETFE), polytetrafluoroethylene (PTFE), perfluoroalkoxy (PFA), fluorinated ethylene propylene (FEP), polyvinylidene fluoride (PVDF) or other materials known in the art. The polymer sheet can include amorphous thermoplastic fluoropolymer films such as TEFLON AF 1600™ or TEFLON AF 2400™. Other materials are possible.

Figure 4:
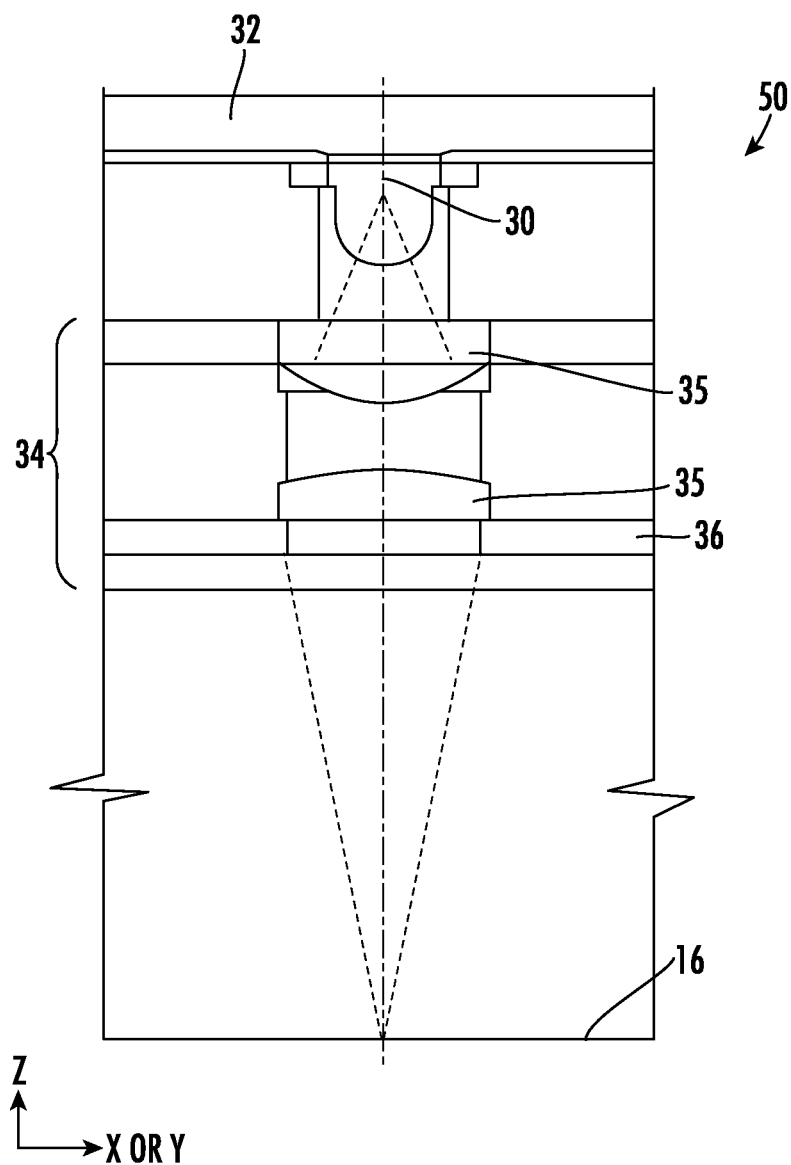
FIG. 4 is a schematic diagram depicting an optical path from a light emitting device to a build plane.

FIG. 4 is a diagram of an embodiment of an optical path 50 from a light emitting device 30 to the build plane 16. The focusing and/or collimation layer 34 includes micro lenses 35 for collimating a conical distribution of light from light emitting device 30 and then for focusing the light upon build plane 16. Focused light passes through the mask 36 which clips out off-angle light before passing to the build plane 16. The free surface 10 of the photocurable resin 8 is somewhere above the lower surface 46 of the transparent sheet 42 (see FIG. 3). An advantage of this design is that a path length from the mask 36 to the build plane 16 is minimized. This minimizes the impact of off angle light that passes through the mask 36 to enable imaging very small pixels for a very high resolution printing system 2.

The specific embodiments and applications thereof described above are for illustrative purposes only and do not preclude modifications and variations encompassed by the scope of the following claims.

What is claimed:

1. A three-dimensional printing system for fabricating a three-dimensional (3D) article comprising:
    a resin vessel for containing a photocurable resin having an upper resin surface;
    a motorized build plate for supporting the 3D article in the photocurable resin;
    a translatable imaging bar including:
        a plurality of light emitting devices arranged along an axis for emitting light generally downwardly;
        a substrate supporting the plurality of light emitting devices;
        a layer of collimation and/or focusing optics that overlay the light emitting devices;
        a mask made of a metal layer formed onto a transparent plate, the mask overlaying the layer of collimation and/or focusing optics, the mask configured to remove off-angle light from light received from the light emitting devices;
        a transparent sheet overlaying the transparent plate; and
        a spacer plate between the transparent plate and the transparent sheet, the spacer plate in contact with the mask and separating the mask from the transparent sheet, the spacer plate defining gas channels between the transparent plate and the transparent sheet, the gas channels are configured to carry a gaseous inhibitor that diffuses downwardly to a lower surface of the transparent sheet and to maintain a local depletion zone between the lower surface of the transparent sheet and a build plane, the local depletion zone translatable with the imaging bar in the photocurable resin.

2. The three-dimensional printing system of claim 1 wherein the transparent plate is a glass plate.

3. The three-dimensional printing system of claim 1 wherein the metal layer is between the transparent plate and the spacer plate.

4. The three-dimensional printing system of claim 1 wherein the transparent sheet is a polymer sheet having a chemical resistance to the photocurable resin while allowing transmission of oxygen as the gaseous inhibitor.

5. The three-dimensional printing system of claim 4 wherein the transparent sheet is formed from at least one polymer including one or more of polyvinylidene fluoride (PVDF), ethylene chlorotrifluoroethylene (ECTFE), ethylene tetrafluoroethylene ethyl (ETFE), polytetrafluoroethylene (PTFE), perfluoroalkoxy (PFA), fluorinated ethylene propylene (FEP), and an amorphous thermoplastic fluoropolymer.

* * * * *